US008639213B1

(12) United States Patent
Martínez et al.

(10) Patent No.: US 8,639,213 B1
(45) Date of Patent: Jan. 28, 2014

(54) METHOD, COMPUTER PROGRAMS AND A USE FOR AUTOMATIC IDENTIFICATION AND CLASSIFICATION OF LAND USES

(75) Inventors: Enrique Frías Martínez, Madrid (ES); Vanessa Frías Martínez, Madrid (ES)

(73) Assignee: Telefonica S.A., Madrid (ES)

( * ) Notice: Subject to any disclaimer, the term of this patent is extended or adjusted under 35 U.S.C. 154(b) by 0 days.

(21) Appl. No.: 13/556,629

(22) Filed: Jul. 24, 2012

(51) Int. Cl.
*H04W 8/14* (2009.01)
(52) U.S. Cl.
USPC ................................ 455/405; 455/406; 705/5
(58) Field of Classification Search
USPC ......... 455/405, 410, 33.1, 67.1, 34.1; 379/58, 379/114.14; 356/459; 705/2, 5
See application file for complete search history.

(56) References Cited

U.S. PATENT DOCUMENTS 6,594,481 B1 * 7/2003 Johnson et al. ............... 455/410

* cited by examiner

*Primary Examiner* — Phuoc H Doan
(74) *Attorney, Agent, or Firm* — Sughrue Mion, PLLC

(57) ABSTRACT

A method, computer programs and a use for automatic identification and classification of land uses. The method including a computing mechanism running in a computer device receiving as inputs, a geographical region R, a plurality of base stations giving coverage to the geographical region R and a call records generated by individuals using the base stations, and performing automatically the identification and classification of land uses by making use of information extracted during a given time period from the call records. The programs include code adapted to perform the approximation of each coverage region when the program is run on a computer, and to perform a comparison when the program is run on a computer.

14 Claims, 3 Drawing Sheets

METHOD, COMPUTER PROGRAMS AND A USE FOR AUTOMATIC IDENTIFICATION AND CLASSIFICATION OF LAND USES

FIELD OF THE ART

The present invention generally relates in a first aspect to a method for the identification and classification of land uses, and more particularly to a method for the automatic identification and classification of land uses using the information provided from cell phone networks.

A second aspect of the present invention relates to computer programs comprising computer program code means adapted to perform an approximation of each coverage region, and to perform a comparison. The computer programs may be stored on computer readable media.

A third aspect of the invention relates to a use of information from a plurality of call records during a given time period to automatically identify and classify land uses of a geographical region R by measuring a number of interactions received by each one of a plurality of base stations giving coverage to said geographical region R during said given period of time.

The concept of land use refers to the type of activities that take place in a specific geographic area, such as residential, industrial, etc.

By base station in the current description, it has to be understood a base station providing communications under any standards, sometimes referred to as BTS. The term encompasses a radio base station, or the so-called node B or eNB and other development standards. The base station is preferably part of a cellular tower, but other embodiments are also possible.

Call records are sometimes referred to Call Detail Records (CDRs).

PRIOR STATE OF THE ART

With the increasing capabilities of mobile devices, individuals leave behind footprints of their interaction with the urban environment. As a result, new research areas focus on improving the quality of life in an urban environment by understanding the city dynamics through the data provided by ubiquitous technologies. One of these areas is the automatic identification of land uses using information collected from pervasive infrastructures (such as cell phone networks).

Current approaches for the identification of land uses imply the use of questionnaires or the training of individuals that collect information directly on site.

Some authors have already used cell phone traces to implement urban analysis studies. Among others, prior state of the art studies uses for example, aggregated cell-phone data to analyze urban planning in Milan, identified behavioral patterns from the information captured by phones carrying logging software, and/or used bluetooth to characterize pedestrian flow data. Previous work on the use of the cell phone data for land use analysis is scarce, although some studies has been presented to solve related questions. For example, one monitors the dynamics of Rome and obtains clusters of geographical areas measuring cell phone towers activity using Erlangs. Another study, analyses four different geographical spots at different times in Bangkok. Related to this present invention, another prior study used eigendecomposition to study the time structure, finding correlations between the number of Erlangs and the commercial activity of the area.

Some patents already focus their attention in the automatic identification of specific land uses mainly using satellite images. For example US 2006/0294062 uses images to determine the percentage of land available for development, US 2007/0162372 for the prediction of economic land use and U.S. Pat. No. 7,873,524 monitors the use of land to raise alarms if risk situations arise. These inventions always focus in a specific land use and do not consider the variety of uses defined in the present invention.

PROBLEMS WITH EXISTING SOLUTIONS

The main limitations of the current approaches are the cost in time and money due to the need of training individuals for collecting data and/or the need to prepared, send and collect questionnaires. Also there is the fact that individuals are increasingly opposed to provide information they may consider personal. As a result these studies are typically done every two to four years which highly limits the study of the evolution of land uses in a city. The present invention proposes to solve these limitations because the use of pervasive infrastructures drastically reduces the cost and eliminates the need of collection data on-site. As a result, studies can be done as frequently as needed.

DESCRIPTION OF THE INVENTION

It is necessary to offer an alternative to the state of the art which covers the gaps found therein, particularly related to the lack of proposals which really allows the identification and classification of land uses in urban areas using the information provided by cell phone records.

To that end, the present invention provides, in a first aspect, to a method for automatic identification and classification of land uses, for resources allocation or tourism characterization comprising computing means running in a computer device receiving as inputs, a geographical region R, a plurality of base stations giving coverage to said geographical region R and a plurality of call records generated by individuals using said plurality of base stations On contrary to the known proposals, the method comprises performing automatically said identification and classification of land uses by making use of information extracted during a given time period directly from said plurality of call records.

On a preferred embodiment, the method of the invention comprises characterize the activity of each one of said geographical region R and assign to each region R a set of labels in order to identify the land use activity characterized.

In another preferred embodiment, the method of the present invention comprises the use of the land uses identification and characterization for urban planning applications, resources allocation and/or tourism characterization.

Each coverage region of each one of said plurality of base stations is approximated by a 2-dimensional non-overlapping polygon by using a Voronoi tessellation.

Other embodiments of the method of the invention are described according to appended claims, and in a subsequent section related to the detailed description of several embodiments.

A second aspect of the present invention relates to a computer program comprising computer program code means adapted to perform said approximation of each coverage region of claim 11 when the program is run on a computer, and to a computer program comprising computer program code means adapted to perform said comparison of claim 12 when the program is run on a computer.

A third aspect of the invention relates to a use of information from a plurality of call records during a given time period to automatically identify and classify land uses of a geographical region R by measuring a number of interactions received by each one of a plurality of base stations giving coverage to said geographical region R during said given period of time.

BRIEF DESCRIPTION OF THE DRAWINGS

The previous and other advantages and features will be more fully understood from the following detailed description of embodiments, with reference to the attached drawings, which must be considered in an illustrative and non-limiting manner, in which.

DETAILED DESCRIPTION OF SEVERAL EMBODIMENTS

Figure 1:
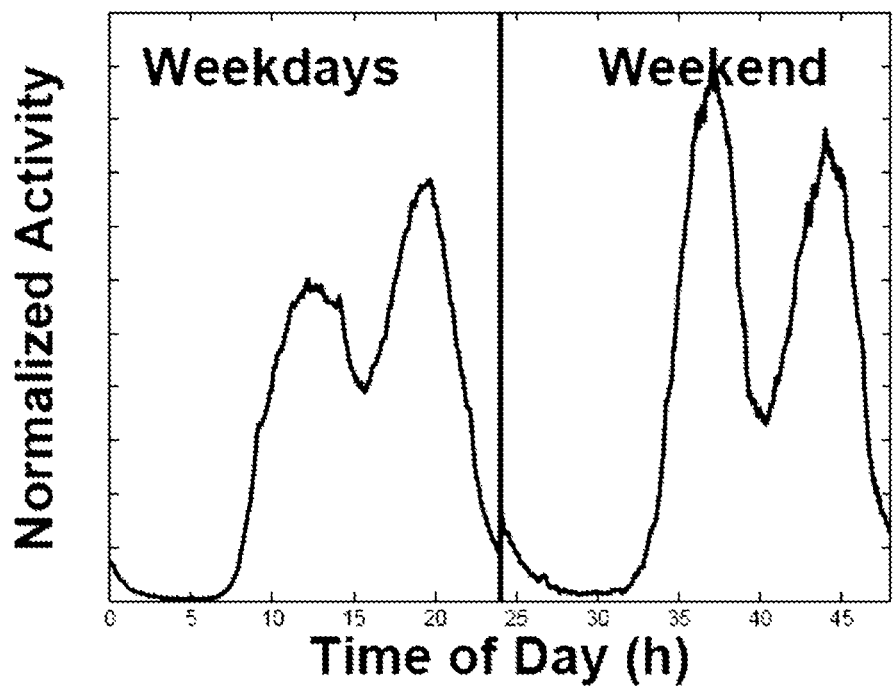
FIG. 1 shows an example of a typical representation of the aggregate weekday-weekend activity of a generic BTS tower. Each 24 hour period has typically two peaks corresponding to a morning and an afternoon peak. The normalized value of those peaks will be used as an indication of the land use.

The present invention proposes, in order to automatically identify land use behaviors, a technique that makes use of the information extracted from cell phone networks. Cell phone networks are built using base transceiver station (BTS) towers that are in charge of communicating cell phones with the network. A given geographical region will be serviced by a set of BTSs BTS={bts1 ... btsN}, each one characterized by its geographical coordinates (latitude, longitude). For simplicity, it is assumed that the area of coverage of each BTS, the cell, can be approximated by a 2-dimensional non-overlapping polygon, and approximate it using Voronoi tessellation.

Call Detail Record (CDR) databases are populated whenever a mobile phone makes/receives a call or uses a service (e.g. SMS, MMS). Hence, there is an entry for each interaction with the network, with its associated timestamp and the BTS that handled it, which gives an indication of the geographical location of the mobile phone at a given moment in time. It can be noted that no information about the position of a user within a cell is known. The set of fields typically contained in a CDR include: (a) originating encrypted phone number; (b) destination encrypted phone number; (c) identifier of the BTS that handled the originating phone number (if available); (d) identifier of the BTS that handled the destination phone number (if available); (e) date and time of the call; and (f) duration of the call.

Using the information contained in a CDR database generated from the BTS towers that give coverage to city, it can be characterized the use that citizens make of specific urban areas. In order to do so, the city is initially divided into the coverage areas defined by the Voronoi tessellation. Each area is then characterized by the activity associated to its corresponding BTS tower which is measured as the number of interactions (voice, SMS and MMS) per time unit. This measure will be the signature of the BTS tower. Once all the signatures have been computed, a rule-based knowledge based assigns labels that describe the uses of a BTS and by extension of its area of coverage.

Although the invention presented can be applied to both rural and urban environments, it is better to apply it in urban environment where the high density of towers allows identifying well defined behaviors.

The key element that defines the behaviors identified is the amount of time covered by the CDR database used. In general is recommended to use a CDR database of 30 days. Shorter databases will not have enough information to characterize land uses, while longer periods of time will mix stationary behaviors that will produce fuzzier land uses.

Given an initial set of BTS=$(bts_1; bts_2; \ldots; bts_N)$ that gives coverage to an urban region R characterized by its Voronoi tessellation R=$(V_1, V_2, \ldots, V_N)$, the present invention seek to assign a land use label (residential, commercial, nigh activity, weekend activity, office/industrial park or combined) to each $V_i$ of R using the information contained in a 30-day Call Detail Record database collected by BTS.

The method of the present invention has two parts: (1) Characterization of the Activity of Each Geographical region, and (2) Labeling of the activity of each geographical region.

A. Characterization of the Activity of Each Geographical Region:

For each $bts_i$=1 ... n, a signature that describes the number of interactions handled every 5 minutes is generated as follows:

Step 1: Construct the Activity Matrix $A_i$ for each $bts_i$. $A_i$ is a two-dimensional matrix where each element $A_i(\delta,r)$ contains the activity of $bts_i$ during a 5-minute time interval r on a given day $\delta$, where:

$$\delta \in \{1, \ldots, \text{NumberOfDays}\}$$

$$\Gamma \in \{1, \ldots, 288\}$$

With NumberOfDays, the number of days collected by the CDR database (typically 30 days) and 288 indicating the total number of measurements per each 24 hour period. Although other r intervals are possible, higher resolutions did not add any extra information (while increasing the complexity), and lower resolutions affected greatly the results due to the linear interpolation effect.

Step 2: Aggregate & Concatenate Information. Human dynamics are well differentiated between week days and weekend days [7], and those differences will translate into different BTS levels of activity. In order to preserve that information the present invention opts to build each $bts_i$ signature $X_i$ as the concatenation of the aggregated activity of the BTS during weekdays ($Y_i$, Monday to Friday) and weekends ($Z_i$, Saturday and Sunday), producing a final signature of 576 elements. The weekday-weekend aggregation is computed as (++ indicates concatenation):

$$Y_i(\Gamma) = \frac{1}{|\delta \in \text{weekday}|} \sum_{\delta \in weekday} A_i(\delta, \Gamma)$$

$$Z_i(\Gamma) = \frac{1}{|\delta \in \text{weekday}|} \sum_{\delta \in weekday} A_i(\delta, \Gamma)$$

-continued $$X_i = Y_i + + Z_i$$

Step 3: Normalization. Once the signature $X_i$ has been obtained it is normalized so the area under the curve has a value of 1. Formally being $T_i$ the normalized vector of $X_i$:

$$T_i(\Gamma) = \frac{X_i(\Gamma)}{\sum_t X_i(t)}$$

By extension the signature $T_i$ also characterizes the corresponding geographical area of the Voronoi tessellation $V_i$. FIG. 1 presents a typical representation of activity signature of a BTS. Both the weekday activity and the weekend activity are typically characterized by two peaks, one between 10 am and 2 pm another between 4 pm and 8 pm. The relation between these peaks defines the actual land use. At what time is that maximum value of activity highly depends on cultural factors and the time during the year where the CDR data used to generate the signatures represents.

Step 4: Using $T_i$, identify the maximum values of activity in the range 10 am-2 pm and 4 pm-8 pm, for both weekdays and weekends. Formally:

$WDM_i$: represents the maximum level of activity during weekdays in the 10 am-2 pm time period.

$WDA_i$: represents the maximum level of activity during weekdays in the 4 pm-8 pm time period.

$WEM_i$: represents the maximum level of activity during weekends in the 11 am-2 pm time period.

$WEA_i$: represents the maximum level of activity during weekends in the 4 pm-8 pm time period.

Two more values are obtained for each signature activity:

$MWD_i$: represents the maximum level of activity during weekdays outside the 10 am-2 pm and 4 pm-8 pm time periods.

$MWE_i$: represents the maximum level of activity during weekends outside the 10 am-2 pm and 4 pm-8 pm time periods.

B. Activity Labeling of Each Geographical Region:

Given the set of labels USE={RESIDENTIAL, COMERCIAL, INDUSTRIAL/OFFICE, NIGHT LEISURE, WEEKEND LEISURE, COMBINED}, the second step of the method assigns to each area of coverage $V_i$ the set of labels from USE that identifies its land use using the information extracted from the corresponding activity signature. For each $T_i$, i=1, ..., N:

Step 1: Rule for assigning INDUSTRIAL/OFFICE land uses:

IF $WDM_i > WDA_i$ AND $0.15 WDM_i > WEM_i$ AND $WEM_i < 0.15 WDM_i$ AND $WEA_i < 0.15 WDM_i$

THEN ASSIGN INDUSTRIAL/OFFICE TO $V_i$

Figure 2:
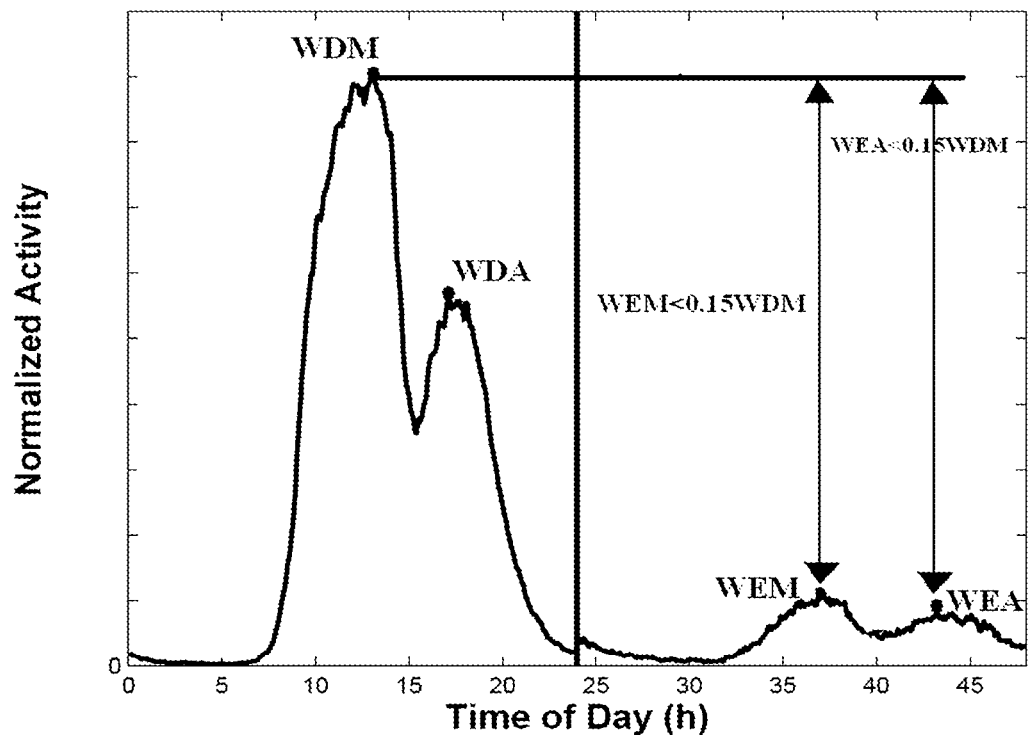
FIG. 2 shows a typical representation of the activity signature that characterizes an industrial park/office land use, according to an embodiment of the present invention.

The rules captures the idea that INDUSTRIAL/OFFICE geographic areas have mainly activity during weekdays and the activity of weekends is non-relevant compared to weekday activity. Formally the rule specifies that the maximum level of activity during weekdays is in the 11 am-2 pm time period and that the maximum peaks during weekends represent less than 15% of the activity during weekdays. FIG. 2 graphically presents a typical representation of an INDUSTRIAL/OFFICE area.

Step 2: Rule for assigning COMMERCIAL land uses:

IF $WDM_i > WDA_i$ AND $WEM_i > WEA_i$ AND $WEM_i > 0.5 WDM_i$

THEN ASSIGN COMMERCIAL TO $V_i$

Figure 3:
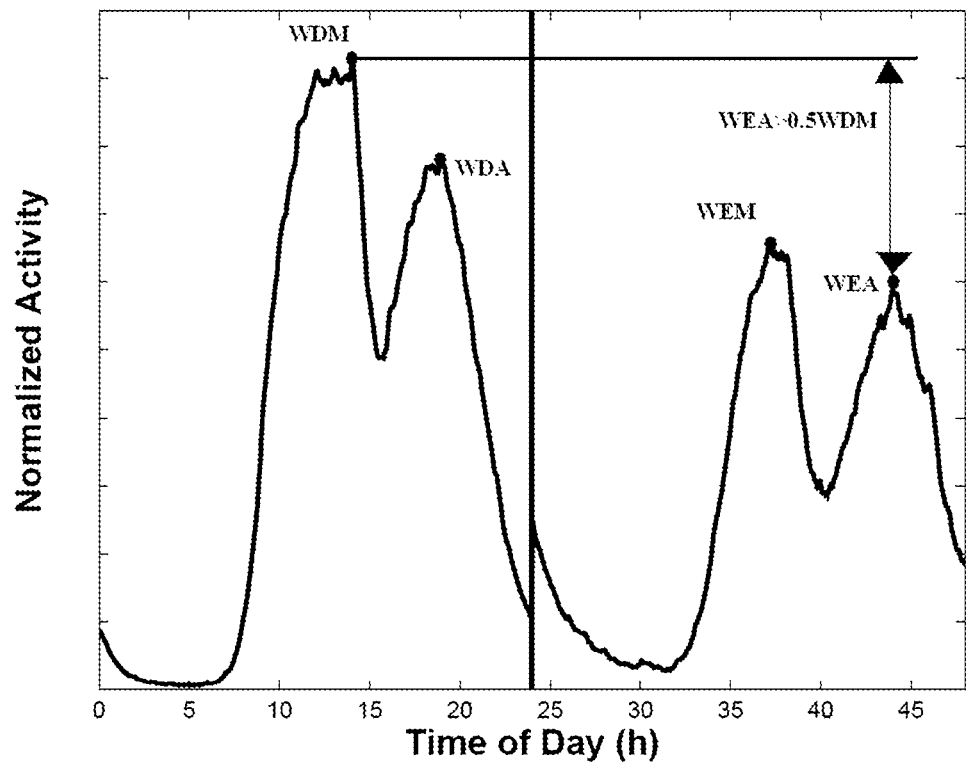
FIG. 3 shows a typical representation of the activity signature that characterizes a commercial land use, according to an embodiment of the present invention.

Commercial areas, from a BTS activity perspective, are characterized by the fact that they have relevant activities both during weekdays and weekends (the activity during weekends have to be at least 50% of the activity during weekdays), and also, both during weekdays and weekends, the activity in the morning is higher than in the afternoon. FIG. 3 graphically presents a typical representation of a COMMERCIAL area.

Step 3: Rule for assigning NIGHLIFE land uses:

IF $(WEM_i > WEA_i$ AND $MWE_i > 0.7 WEM_i$ AND $(MWE_i < 10$ AM OR $MWE_i > 8$ pm) OR $WEA_i > WEM$ AND $MWE_i > 0.7 WEA_i$ AND $(MWE_i < 10$ AM OR $MWE_i > 8$ pm))

THEN ASSIGN NIGHTLIFE TO $V_i$

Figure 4:
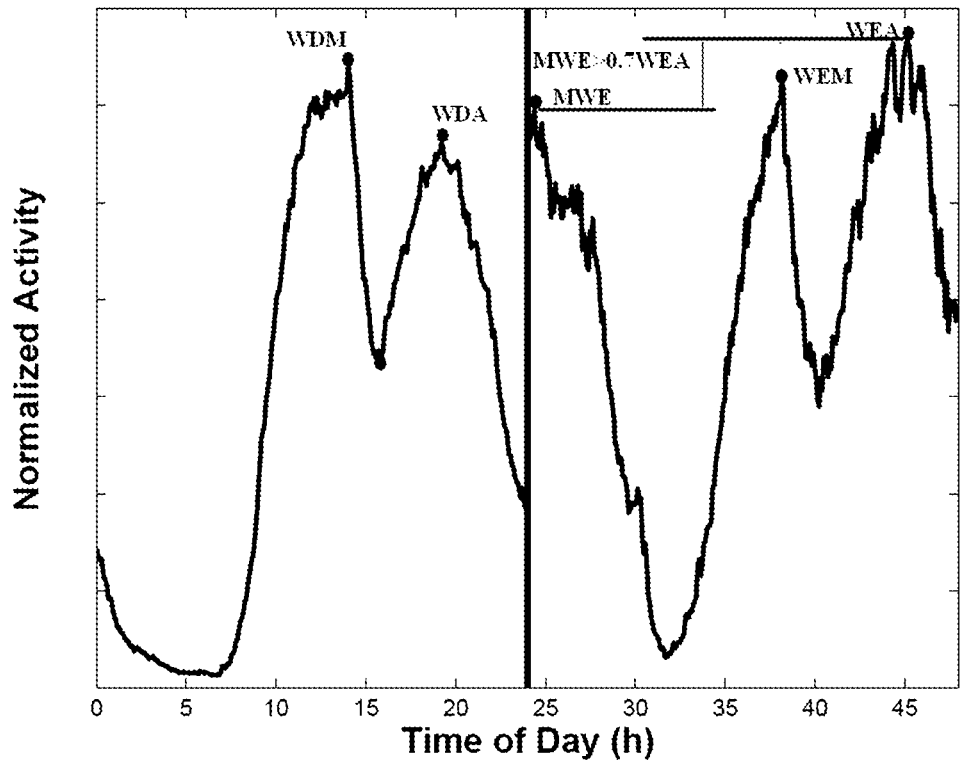
FIG. 4 shows a typical representation of the activity signature that characterizes a night activity land use, according to an embodiment of the present invention.

This rule captures the idea that NIGHLIFE areas will have activity during weekends typically between 8 pm and 4 am. The rule specifies than the maximum activity outside 10 am-2 pm and 4 pm-8 pm time periods has at least 70% of the activity of those periods, indicating nightlife activities. The information during weekdays in this case is not relevant. FIG. 4 graphically presents a typical representation of a NIGHLIFE activity area (in this case in verifies the second cart of the OR).

Step 4: Rule for assigning WEEKEND LEISURE land uses:

IF $WEM_i > WEA_i$ AND $0.66 WEM_i > WDM_i$ AND $0.66 WEM_i > WDA_i$

THEN ASSIGN WEEKEND LEISURE TO $V_i$

Figure 5:
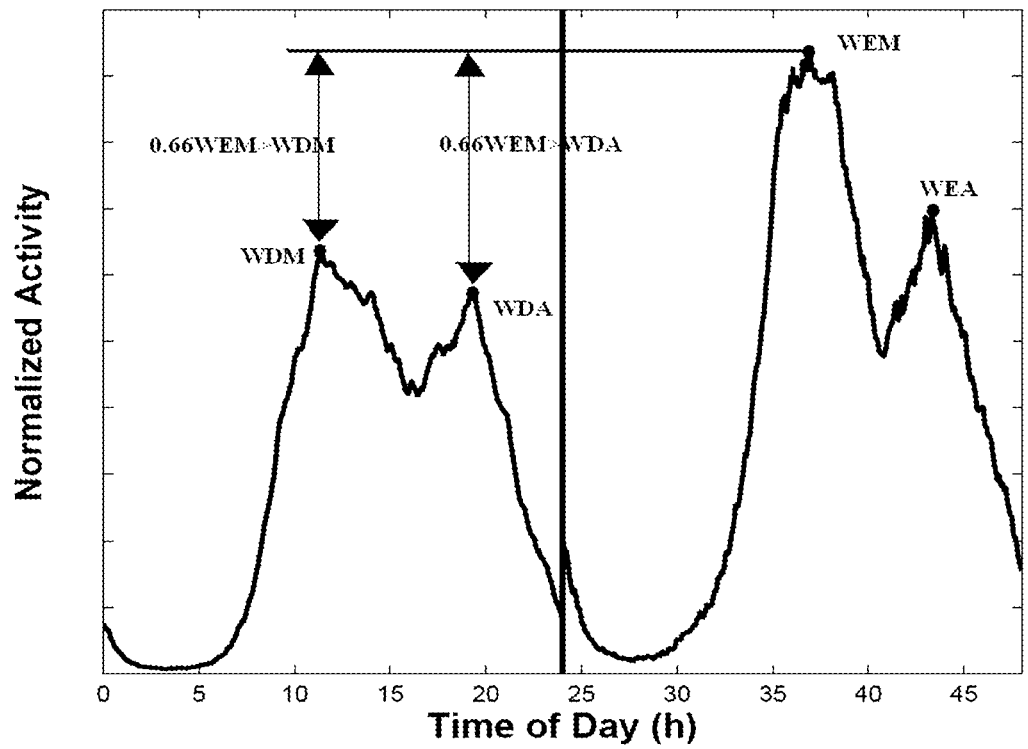
FIG. 5 shows a typical representation of the activity signature that characterizes a weekend leisure land use, according to an embodiment of the present invention.
Figure 6:
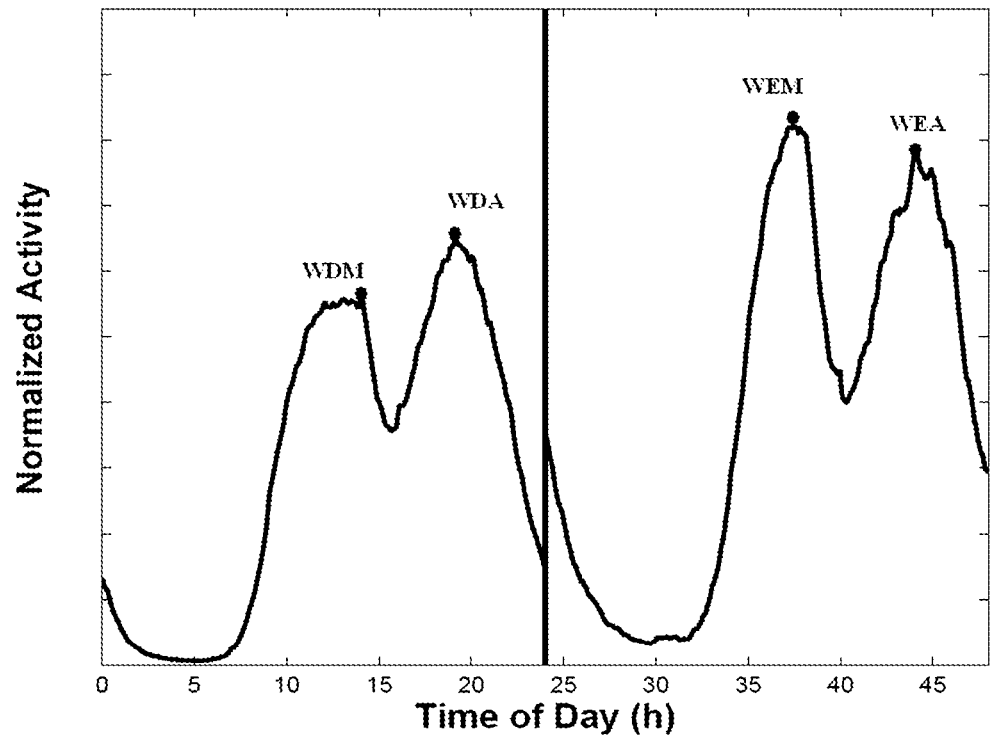
FIG. 6 shows a typical representation of the activity signature that characterizes a residential land use, according to an embodiment of the present invention.

This rule represents the idea that WEEKEND LEISURE areas (such as parks) takes place during light hours in weekends (WEM>WEA) and that the activity is higher (at least 33% higher) during weekends than during weekdays. FIG. 5 graphically presents a typical representation of a WEEKEND LEISURE activity area.

Step 5: Rule for assigning RESIDENTIAL land uses:

IF $WDM_i < WDA_i$ AND $WEM_i > WDA_i$ AND $WEA_i > WDA_i$

THEN ASSIGN RESIDENTIAL TO $V_i$

RESIDENTIAL behavior is characterized by the fact that there is more activity during weekends than during weekdays, and that during weekdays the activity is higher in the afternoon than in the morning (WDM<WDA) representing the idea that people use their cell phone more when day are not in working hours to contact their social network. FIG. 5 graphically presents a typical representation of a RESIDENTIAL activity area.

Step 6: Rule for assigning COMBINED land uses:

IF $V_i$ HAS NO LABELS

THEN ASSIGN COMBINED TO $V_i$

Step 7 assigns a COMBINED land use if none of the previous rules have assigned a label. This case can be typical when an area has more than one land uses, and as a result the signature obtained is a combination of the land uses involved. In general, when applying the method to an urban CDR dataset, close to 40% of the areas will be classified as COMBINED because in dense urban areas it is typical than more than one use occurs in the same geographical area.

The values used to generate the rules for this classification can be found in [8] and [9] where different clustering techniques were applied to BTS activity data to identify common signatures of behavior.

In general the previous rules have been design in an exclusive way, i.e. once an area is classified with one land use; no other antecedent of the rules will be true so no other label will be assigned. This is not the case of NIGHLIFE land use, which can be assigned in combination with any other label. Typically, considering only the areas that are not assigned a COMBINED land use; close to 50% correspond to RESIDENTIAL uses, 30% to COMMERCIAL uses, 10% to INDUSTRIA, 5% NIGHT ACTIVITIES and 5% to WEEKEND LEISURE. These values are just indicative of a typical urban environment and can vary not only between different cities but also between different moments of the year in the same city.

ADVANTAGES OF THE INVENTION

The invention here presented solves the limitations that previous approaches have when identifying land uses, mainly:

- it does not need the use of questionnaires or on-site data collection for capturing the information, which lowers the cost for obtaining the results.
- land uses can be identified as frequently as needed, which is especially useful for study the evolution of land uses over time.
- land uses can be identified for different groups of individuals, i.e. elders, young, socio-economic divisions or tourists. The only difference in the present invention consists on filtering the original CDR database to consider only the entries that are done by the group in which the study focuses.

Potential Uses of the Invention

The invention is relevant for a variety of urban planning applications, like urban zoning validation, resources allocation and tourism characterization.

In the context of urban planning, urban zoning is defined as the designation of permitted uses of land based on mapped zones which separate one set of land uses from another (for example residential areas from industrial areas). One of the main problems of zoning is to actually evaluate to which extent the areas are being used as required or planned, because the collection of data has to be done on site. The present invention approach allows comparing the planned used of a city with the actual use that citizens give to the different areas of the city without the need of on-site data collection.

One of the main problems of city halls is how to allocate resources over the city to control problems, being nightlife areas, one type of land uses that causes more disturbances. The problem is that the identification of nightlife areas changes over the year (nightlife areas move from winter to summer) and those new areas are continuously appearing and old ones disappearing. With the present invention it can be easily identified these areas to allocate resources and adapt to changes.

In any modern city, tourism is one of the main industries. The study of tourists is key for any city hall to cater to their needs and preferences. Questions such as where do tourists stay or where do they shop are very relevant for a city. The invention proposed can characterize how tourists use the city (the different land uses they give) by just considering a CDR database containing tourist information (which can be identified by the fact that they will be roaming in the network.).

ACRONYMS

CDR Call Detail Records
BTS Base Transceiver Station
MMS Multimedia Messaging System
SMS Short Message Service

The invention claimed is:

1. A method for automatic identification and classification of land uses, the method comprising:
    using a computer device to receive as inputs: a geographical region R, a plurality of base stations giving coverage to said geographical region R, and a plurality of call records generated by individuals using said plurality of base stations,
    wherein said identification and classification of land uses are performed automatically by making use of information during a given time period extracted directly from said plurality of call records, and
    wherein said information extracted from said plurality of call records is contained in a call detail record (CDR) database.

2. The method according to claim 1, further comprising extracting said information from said plurality of call records during 30 days.

3. The method according to claim 1, further comprising characterizing the activity of each geographical region R.

4. The method according to claim 3, wherein said activity is characterized by measuring a number of interactions received by each one of said plurality of base stations during said given time period.

5. The method according to claim 4, further comprising differentiating said activity of each one of said plurality of base stations between weekdays and weekend days.

6. The method according to claim 4, further comprising measuring said number of interactions every 5 minutes.

7. The method according to claim 6, wherein said interactions measured comprises: voice calls, SMS, MMS or a combination thereof.

8. The method according to claim 3, further comprising assigning to each geographical region R a set of labels in order to identify the land use using said characterized activity.

9. The method according to claim 8, wherein said land use labels comprise any of: residential, commercial, night leisure, weekend leisure, office/industrial and/or combined.

10. The method according to claim 1, wherein each coverage region of each one of said plurality of base stations is approximated by a 2-dimensional non-overlapping polygon by using a Voronoi tessellation.

11. The method according to claim 1, further comprising comparing a planned use of an area with the actual use of said area.

12. A non-transitory computer readable medium storing a program causing a computer to execute a method for automatic identification and classification of land uses, the method comprising:
    using the computer to receive as inputs: a geographical region R, a plurality of base stations giving coverage to said geographical region R, and a plurality of call records generated by individuals using said plurality of base stations,
    wherein said identification and classification of land uses are performed automatically by making use of information during a given time period extracted directly from said plurality of call records, and
    wherein said information extracted from said plurality of call records is contained in a call detail record (CDR) database.

13. The non-transitory computer readable medium according to claim 12, further comprising comparing a planned use of an area with the actual use of said area.

14. A system for automatically identifying and classifying land uses, the system comprising:
    a receiving unit that receives a plurality of call records during a given time period, from a call detail record (CDR) database;
    a determining unit, comprising a processor, that uses the plurality of call records received by the receiving unit to determine a number of interactions received by each of a plurality of base stations giving coverage to the geographical region R during the given period of time; and a classification unit that uses the number of interactions determined by the determining unit to automatically identify and classify the land uses of the geographical region R.

* * * * *